Feb. 11, 1969    A. BIANCHERIA ET AL    3,427,222

NUCLEAR FUEL ELEMENTS

Filed Oct. 15, 1965

WITNESSES:
Bernard R. Gregway
Lee P. Johns

INVENTORS
Amilcare Biancheria &
Robert J. Allio.
BY
Frederick Shoop
ATTORNEY

United States Patent Office 3,427,222
Patented Feb. 11, 1969

3,427,222
NUCLEAR FUEL ELEMENTS
Amilcare Biancheria and Robert J. Allio, Pittsburgh, Pa., assignors to Westinghouse Electric Corporation, Pittsburgh, Pa., a corporation of Pennsylvania
Filed Oct. 15, 1965, Ser. No. 496,353
U.S. Cl. 176—68              2 Claims
Int. Cl. G21c 3/02, 3/30, 3/06

ABSTRACT OF THE DISCLOSURE

A nuclear fuel element having a configuration of an elongated tube with closed ends; the tube containing ceramic bodies of sintered fissionable material; a coating on the bodies which coating comprises a predetermined amount of an element functioning as a burnable poison.

---

Figure 1:
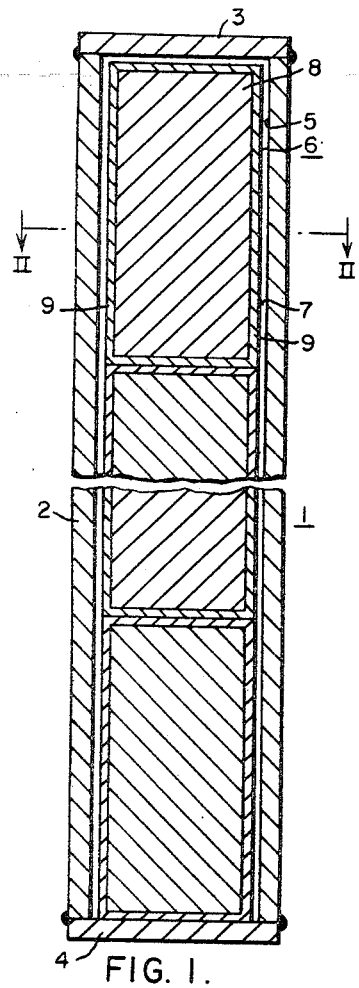

This invention relates to a fuel element for nuclear reactors and more particularly it pertains to a fuel element that incorporates a pellet having a burnable poison in a coating.

A fuel element or rod of the type involved herein usually includes an elongated tube having closed ends. The tube is preferably cylindrical and may be composed of stainless steel. A plurality of pellets of fissionable material, such an enriched $UO_2$, are disposed in end-to-end abutment within the tube.

It is well known that the process of nuclear fission involves the disintegration of the fissionable nuclear fuel material into two or more fission products of lower mass number. Among other things the process also includes a net increase in the number of available free neutrons which are the basis for a self-sustaining reaction. When a reactor has operated over a period of time the fuel element with fissionable material must ultimately be replaced due to depletion. Inasmuch as the process of replacement is time consuming and costly it is desirable to extend the life of a given fuel element as long as practically feasible. For that reason, deliberate additions to the reactor fuel of parasitic neutron-capturing elements in calculated small amounts may lead to highly beneficial effects on a thermal reactor. Such neutron-capturing elements are usually designated as "burnable poisons" if they have a high probability (or cross section) for absorbing neutrons while producing no new or additional neutrons or changing into new poisons as a result of neutron absorption. During reactor operation the burnable poisons are progressively reduced in amount so that there is a compensation made with respect to the concomitant reduction in the fissionable material.

The life of a fuel element may be extended by combining an initially excessive amount of fuel as well as a calculated amount of burnable poison. During the early stages of operation of such a fuel element, excess neutrons are absorbed by the burnable poison which undergoes transformation to elements of low neutron cross section which do not substantially affect the reactivity of the fuel element in the later period of its life when the neutron availability is lower. The burnable poison compensates for the excessive neutron production during the early use of the fuel element, but progressively less poison captures neutrons during the later use of the fuel element, so that a long life at relatively constant fission level is assured for the fuel element. Accordingly, with a fuel element containing fuel and burnable poison in carefully proportioned quantity, an extended fuel element life can be achieved with relatively constant neutron production and reactivity rate.

Burnable poisons which may be used are boron, gadolinium, samarium, and europium, which upon the absorption of neutrons result in element of sufficiently low neutron capture cross section so as to be substantially transparent to the subsequent fission process. Boron qualifies as an excellent poison because upon irradiation by thermal neutrons it undergoes a reaction as follows:

$$B^{10}+n^1 \rightarrow Li^7+He^4$$

Lithium and helium are harmless products of fission insofar as this process is concerned, because they have relatively insignificant neutron absorption properties.

The incorporation of burnable poisons in fuel elements has been recognized in the nuclear field as an effective means of increasing fuel capacity and thereby extending core life. Burnable poisons are used either uniformly mixed with the fuel (i.e. distributed poison) or are placed discretely as separate elements in the reactor, so arranged that they burn out or are depleted at about the same rate as the fuel. Thus, the net reactivity of the core is maintained relatively constant over the active life of the core.

Most of the effort has been directed towards homogeneously distributing the poison within a mass of powdered fuel particles prior to sintering, though some effort has been expended on distributing the poison in the cladding. Efforts to introduce boron compounds into the fuel have met with difficulties as for instance, the formation of volatile boron compounds during the subsequent sintering of the powdered fuel into pellet form whereby much of the boron escapes and is not retained in the fuel element.

Although several methods of introducing and retaining boron in the fuel pellets are technically feasible, all such possible methods require basic changes in the sintering cycle and result in increased cost or in difficulties in meeting normal impurity specifications. Moreover, deleterious effects of the poisons, particularly boron, on the properties of the cladding have made the incorporation of boron in the cladding undesirable. Such effects have included a decreased ductility of the tube during operation of the fuel element in the reactor, poor welding characteristics, and weakening of the cladding during brazing.

The introduction of separate rods composed of a burnable poison between separate fuel elements in a reactor is not entirely satisfactory.

Accordingly it is an object of this invention to provide a nuclear fuel element having pellets of fissionable material with a coating of burnable poison on the exterior thereof and a relatively simple and economized process for applying the coating to the pellets.

It is another object of this invention to provide a nuclear fuel pellet having a coating in which boron is incorporated to function as a burnable poison and having no deleterious effect upon the fuel element or its subsequent operation in the core of a reactor.

It is another object of this invention to provide a simple and economical method for applying a coating of burnable poison to the surface of a nuclear fuel pellet.

It is another object of this invention to provide a method for applying a coating of boron material to the outer surfaces of a nuclear fuel pellet composed of uranium dioxide ($UO_2$), or other fissionable material.

It is another object of this invention to provide methods for applying a coating of boron material functioning as a burnable poison to a uranium oxide fuel pellet which coating has a controlled thickness.

Other objects and advantages of the invention will become apparent hereinafter.

Figure 2:
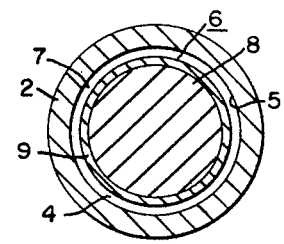

For a better understanding of the nature and objects of the invention, reference is made to the following detailed description and drawings in which:

FIGURE 1 is a longitudinal sectional view of a fuel element having a plurality of coated sintered pellets of uranium oxide; and FIG. 2 is a transverse sectional view along the line II—II of FIG. 1.

In accordance with this invention it has been found that the foregoing problems have been solved by including burnable poisons in fuel elements as a coating on sintered pellets of fissionable material after the sintering cycle with an appropriate material. When a burnable poison, such as boron, is applied as a coating, cover or casing on the sintered pellet of the fuel element after the sintering cycle the previously mentioned difficulties entailed in the sintering of the combined poison and fissionable material are completely avoided. The coating process is simple, and is readily carried out, and no significant difficulties have been encountered in applying the coating of burnable poison to the outer surface of a sintered pellet of fuel. Extremely successful results have been secured in producing precisely sized pellets with a controlled thickness of coating of burnable poison. Coating thicknesses of 0.02–5.0 mils have been shown to be suitable. The problem of controlling the coating thickness is vital to the attainment of a satisfactory amount of burnable poison for a given quantity of fuel as well as maintaining pellet dimensions.

More specifically, the invention comprises a fuel element comprising sintered pellets of a fissionable material, each pellet having applied thereto a layer or coating of predetermined thickness comprising a precise amount of burnable poison for a nuclear reactor and methods for providing the same. The fuel element includes an outer cladding of stainless steel or zircaloy in which are pellets or bodies of sintered particles of fissionable material such as enriched $UO_2$, and each pellet or body has a coating of predetermined thickness containing a burnable poison such as boron, cadmium, gadolinium, samarium, and europium, all of which have a high initial neutron capture cross section and which upon the absorption of neutrons result in elements of low neutron capture cross section. The neutron capture cross sections of the several elements used as burnable poisons are

| | Barns |
|---|---|
| Boron | 755 |
| Cadmium | 2550 |
| Gadolinium | 46000 |
| Samarium | 5500 |
| Europium | 4600 |

Referring to FIG. 1, a fuel rod or element is generally indicated at 1, comprises an elongated tube 2 having endclosures 3 and 4 providing an enclosed chamber 5 in which a plurality of fissionable fuel pellets 6 are disposed in end-to-end abutment. The tube 2 and pellets 6 are preferably of circular cross-section and the length of each pellet may be up to about twice the diameter. The pellet diameter is slightly less than that of the tube and forms a clearance space 7 therewith to accommodate any swelling of the pellet during operation.

As shown in FIGS. 1 and 2 each pellet 6 includes a sintered body portion 8 of fissionable material and coating 9 which covers the outer surfaces of the body portion. In a preferred embodimen tthe body portion 8 is composed of sintered uranium oxide ($UO_2$). In making these fuel pellets, uranium oxide, suitably enriched, as for example 3 to 5%, in the form of a powder having a particle size of 200 mesh is initially compacted by pressing into pellets. After compacting, the pellet is sintered at a temperature ranging from 1700 to 1750° C. The density of the pellet after sintering is approximately 90 to 96% of the theoretical density. Thereafter, each pellet is ground, for example, by centerless grinding to a cylindrical shape having a diameter in the range of from 0.2 to 0.5 inch. The pellet is then washed in water and normally dried by vacuum whereupon it is ready for the coating application.

The body portion 8 of the fuel pellets may be composed of a substantial proportion of an oxide of one of the fissionable isotopes, such as U–235, U–233, Pu–239, and Th–232, or mixtures thereof, the balance being U–238 or other uranium or thorium derivatives.

Uranium oxide ($UO_2$) has given excellent results.

One of the various techniques may be employed for applying a coating on the surface of the sintered pellet. The particular technique and the thickness of the coating employed is dependent upon the burnable poison and its nature involved such as boron metal or a boron compound. For example, if the coating is composed of boron metal ($B^{10.8}$) the thickness of the coating may be small, for example, 0.02 to 0.4 mil, while a coating containing boron compound may require a greater thickness of the coating for a comparable amount of boron, for example from 0.05 to 5 mils.

A number of different methods have been successfully employed for applying coatings of predetermined thickness embodying burnable poisons to the pellets. These methods comprise:

(1) Plasma-jet or flame spraying of the burnable poison compounds, with or without additions of uranium dioxide or other ceramic oxide as binders.

(2) Dipping the pellets for a selected period in a slurry or suspensions of controlled viscosity of a burnable poison—for instance aqueous suspensions of boron carbides and ceramic binder such as zirconium silicate, or sodium tetraborate—whereby to apply a coating of desired thickness on each pellet followed by controlled drying and firing at a moderate temperature to fuse the applied coating. The slurry can be sprayed on the pellets, followed by firing at temperatures usually below 1000° C. For thick coatings a plurality of dips and firing may be employed.

(3) Vapor coating the pellets in an atmosphere high in vapors of a relatively volatile and decomposable burnable poison compound, for example boron trichloride, being boiled out of a heated receptacle. The vapors of the boron or stable boron oxide condense on the heated pellets for example 750° C. to the desired thickness.

(4) Electron beam bombardment of the metallic poison such as gadolinium, europium, samarium or boron, upon the pellets. This produces thin metallic layers usually below 0.5 mil in thickness.

In all cases extremely close control is obtained as to the amount of the burnable poison applied. Also the final pellet dimensions can be closely controlled.

The following examples are illustrative of the present invention:

EXAMPLE I

The "plasma spraying" technique employs a mixture of uranium oxide ($UO_2$) and a boron compound sprayed at a temperature of at least 3000° C. onto rotating sintered 3.8% enriched $UO_2$ pellets. The boron compound may be a high temperature ceramic material, such as boron carbide ($B_4C$), boron nitride (BN), or zirconium boride ($ZrB_2$). While the coating is being applied to the pellets they heat up slightly, and after being cooled to room temperature, the desired thickness may be obtained by centerless grinding the coated pellet to the precise coating thickness dimension, 2 to 5 mils being fully adequate. The ratio of boron to uranium oxide in the coating material may be 1 to 100 in parts by weight.

EXAMPLE II

Another method consists of (1) dipping a pellet for about two minutes in an aqueous slurry at 25° C. containing 6 weight percent of boron carbide ($B_4C$) and 34 weight percent of a ceramic binder such as zirconium silicate, about 1% of a suspending agent such as polyvinyl alcohol, balance water, (2) predrying at 90° C., (3) heating at a rate of 5° C. per minute up to a maximum temperature of 950° C., and (4) curing at 950° C. for three hours in an argon atmosphere. For a high quality coating the argon should be of a low moisture content in order to avoid deterioration of the coating. Coating thicknesses of 0.1 to 0.6 mil are obtained. To obtain the required thickness the particle size of the $B_4C$ and the ceramic binder are reduced by ball milling to 0.3 mil or less. As is well known, thickness control is also obtained by suitably controlling the slurry concentration and composition, temperature, wetting and suspending agents and the time of dipping. Several dips can be applied to provide greater coating thicknesses.

EXAMPLE III

A coating of the required thickness is obtained by subjecting heated pellets to an atmosphere of a volatile boron compound such as $BCl_3$ whereby the surface of the pellet is coated by thermal reduction of the compound. In one procedure fuel pellets are placed into a glass tube furnace disposed horizontally and heated by induction or resistance heating means and after they reach a temperature of 800° C. the gas or gases comprising $BCl_3$ and hydrogen are passed through the tube so that the boron compound decomposes and boron metal deposits on the pellet surfaces. It was found that pellet temperatures below 1000° C. are desirable when applying boron coatings. At a temperature of 750° C. the deposition rate is rather slow, while near 1000° C. the coating was not as adherent. At 800° C. the deposition rate and coating properties were highly satisfactory. Flow rates of approximately 380 cc. per minute for hydrogen and 5 cc. per minute for $BCl_3$ are employed. Coating thicknesses of 0.02 to .5 mil are deposited in 10 to 30 minutes. The preferred gas mixture was boron chloride and hydrogen gas. However, other volatile compounds such as diborane ($B_2H_6$) do not require hydrogen.

EXAMPLE IV

A coating of burnable poison is applied to pellets of $UO_2$ by dipping them in an aqueous sodium tetraborate solution ($Na_2B_4O_7 \cdot 10H_2O$) near 100° C. for two minutes then slowly heating the coated pellet to 750° C. which is slightly above the melting point of sodium tetraborate to obtain a uniform coating. The dipping temperature range is 25 to 120° C. with the more even coatings occurring at the higher temperatures. In addition to sodium tetraborate, other boron compounds may be used such as $Na_2O \cdot B_2O_3$, and $Na_2O \cdot 4B_2O_3$, which have melting points of 966° C., and 816° C., respectively. Coating thicknesses of 0.05 to 0.3 mil are deposited in a dip of two minutes. Likewise, pellets dipped in a benzene solution of dichloroboronamide ($Cl_2BNH_2$) and heated to decompose the coating compound to boron nitride (BN) provide a satisfactory refractory coating.

EXAMPLE V

Another method involves vacuum metallizing with boron metal and is normally employed to obtain the thinner coatings. In this method pellets are placed in a rotating fixture within a vacuum chamber. Purified boron metal in a graphite container is placed in the chamber. The boron metal is then bombarded with an electron beam to a temperature above 2300° C. to evaporate the metal. As the pellet rotates the vapor comprising boron deposits on the surface. During a period of one hour a coating thickness of from one-half to one and one-half microns is deposited. The thickness is controlled by determining the rate of deposition of the boron in a short period of a few minutes on a glass slide while maintaining constant such conditions as voltage and distance from boron source to the target surface. An even coating is obtained by rotating the pellet. This method is conducive to excellent thickness control as well as to an extremely adherent coating. Coating thicknesses of 0.02 to 0.4 mil are deposited in 1 to 2 hours.

Accordingly, the foregoing examples are illustrative of methods by which coatings incorporating burnable poisons may be applied to fuel pellets for use in nuclear reactors. Means for controlling the degree of thinness or thickness for a coating on a fuel element pellet are also indicated. For the applications where pure boron metal is deposited, such as Examples III and IV, a coating thickness of $0.04 \pm .004$ mil is required. For the other examples, where coatings of boron compounds are deposited, thickness of 0.05 to 5 mils are provided. Thin coatings are required to avoid significantly changing the $UO_2$ pellet diameter.

Though a coating having one burnable poison element has been described it is presumed that two or more selected burnable poisons may be employed in predetermined ratios to secure desired effects, such as europium and gadolinium.

It is understood that the above specification and drawings are exemplary of technically and economically feasible methods for incorporating burnable poisons in a fuel element and thereby make possible the extension of the core life of a nuclear reactor by economic means. Moreover, the disclosure includes a coated fuel element or pellet having a coating containing burnable poisons and is not limited to the example of boron employed.

What is claimed is:

1. A fuel element suitable for use in a nuclear reactor comprising a cylindrical tube having an internal hollow space of predetermined dimensions, a plurality of pellets of sintered fissionable material disposed in end-to-end abutment within the space and of dimensions spacing them precisely from the walls of the tube, a fusion-bonded coating on the surfaces of each pellet, and the coating having a thickness of from about 0.02 to 5 mils and composed of a boron-containing material to function as a burnable poison.

2. A process for making a fuel element of precise dimension for use in a nuclear reactor comprising the steps of sintering a plurality of uranium oxide particles into a compact body, machining the sintered body to predetermined dimensions, and fusion bonding a coating of boron-containing burnable poison material having a thickness of from 0.02 to 5 mils on the surface of each pellet.

References Cited

UNITED STATES PATENTS

| | | | |
|---|---|---|---|
| 2,546,142 | 3/1951 | Watson | 117—221 X |
| 2,769,114 | 10/1956 | Williams | 117—221 |
| 2,822,302 | 2/1958 | McCaughna | 117—221 |
| 2,961,563 | 11/1960 | Peras | 117—221 X |
| 2,991,601 | 7/1961 | Glatter et al. | 264—.5 X |
| 2,996,412 | 8/1961 | Alexander | 117—221 |
| 3,042,594 | 7/1962 | Hauth | 264—.5 X |
| 3,051,566 | 8/1962 | Schwartz | 264—.5 X |
| 3,097,112 | 7/1963 | Schutze et al. | 117—223 X |
| 3,103,476 | 9/1963 | Mumm | 176—93 X |
| 3,122,484 | 2/1964 | Iskenderian | 176—93 X |
| 3,179,531 | 4/1965 | Koubek | 117—62 X |
| 3,214,499 | 10/1965 | Burnham et al. | 117—113 X |
| 3,244,599 | 4/1966 | Hildebrand | 176—73 X |
| 2,983,663 | 5/1961 | Bassett | 176—68 |
| 3,009,869 | 11/1961 | Bassett | 176—93 |
| 3,042,598 | 7/1962 | Crowther | 176—68 X |
| 3,081,249 | 3/1963 | Whittemore | 264—.5 |

BENJAMIN R. PADGETT, *Primary Examiner.*

M. J. SCOLNICK, *Assistant Examiner.*

U.S. Cl. X.R.

29—420.5; 176—91, 93, 73; 264—.5; 117—169